United States Patent Office 2,858,304
Patented Oct. 28, 1958

2,858,304

ALKALI CELLULOSE AGING

William H. Bradshaw, New Rochelle, N. Y., and Addison H. Lynch and Edward H. Shaw, Rome, Ga., assignors to Celanese Corporation of America, New York, N. Y., a corporation of Delaware No Drawing. Application January 13, 1954
Serial No. 403,907

11 Claims. (Cl. 260—233)

This invention relates to the aging of alkali cellulose and relates more particularly to the continuous aging of alkali cellulose in the form of a slurry of the alkali cellulose in an aqueous alkaline solution.

In the manufacture of viscose it is customary to steep sheets of cellulose pulp in an aqueous caustic solution in order to form alkali cellulose and remove hemicellulose and other impurities from the pulp. Following the steeping operation the pulp is pressed to express caustic solution in excess of the amount desired for retention in the pulp, and the pressed pulp is mechanically disintegrated or shredded to form a mass of fibers resembling bread crumbs. These alkali cellulose crumbs are then placed in covered containers, or aging cans, and allowed to age, usually for 1 to 3 days. During the aging step absorption of oxygen occurs and the degree of polymerization of the alkali cellulose decreases. The aged alkali cellulose is then xanthated, i. e. reacted with carbon disulfide to form sodium cellulose xanthate, and dissolved in aqueous caustic to form viscose.

It is an object of this invention to provide a novel process for the production of aged alkali cellulose in a rapid and economical manner.

Another object of this invention is the provision of an efficient continuous process for the production of aged alkali cellulose.

Other objects of this invention will be apparent from the following detailed description and claims.

According to the present invention the aging of the alkali cellulose is carried out while said alkali cellulose is in the form of a slurry thereof in aqueous alkali containing an emulsifying agent, said slurry containing numerous small bubbles of an oxygen-containing gas uniformly dispersed therein.

In the continuous process of this invention, a mixture of the oxygen-containing gas, such as air, and the slurry of alkali cellulose is subjected to agitation in the presence of the emulsifying agent to form a stream of a relatively stable uniform dispersion of said gas in said slurry. The resulting stream of gasified slurry is then continuously divided into successive separate small batches which batches are moved continuously and successively through an aging zone. In the aging zone, which is maintained at a predetermined controlled temperature, the dispersed oxygen reacts with the alkali cellulose of the slurry to reduce the degree of polymerization of said alkali cellulose to the desired extent. The resulting aged gas-containing dispersion is then subjected to a degassing operation and, preferably, cooled at the same time. Advantageously, the resulting cooled degassed slurry is treated continuously in a dewatering press to separate the aged alkali cellulose, in crumb form, from the aqueous alkali, the latter being recycled to the beginning of the process by mixing it with a further quantity of cellulose to form the slurry. The separated crumbs of aged alkali cellulose are then xanthated and dissolved in aqueous caustic to produce viscose.

In one form of this invention, sheets of cellulose pulp, of the type usually employed for making viscose, are shredded and the resulting shreds are mixed with aqueous alkali to form a slurry, following which a mixture of said slurry, the emulsifying agent, and the oxygen-containing gas is subjected to agitation to form a uniform dispersion of small bubbles of said gas in said slurry. The pulp need not be added to the aqueous alkali in the form of shreds obtained from sheets. Thus, bulk pulp, such as loose cotton linters, may be added, or the slurry may be formed by slowly and continuously feeding a long sheet of cellulose to a pulper containing the aqueous alkali. The emulsifying agent may be incorporated at any stage during or prior to the formation of the dispersion of gas in the slurry.

The initial step in the process, i. e. the step of mixing the shredded cellulose pulp with aqueous alkali to form a slurry, is carried out advantageously by adding the shredded pulp to a heated solution of sodium hydroxide of mercerizing strength, said solution having a concentration of about 7% to 30%, preferably about 18½%. The amount of pulp added to the solution is preferably sufficient to yield a mixture containing about 2% to 6% of cellulose, by weight optimum results being obtained when the concentration of cellulose is about 3 to 5%. Desirably the mixture of cellulose and aqueous alkali is subjected to mild agitation for a suitable period of time, e. g. about 5 to 15 minutes, to produce a uniform slurry of alkali cellulose, before the oxygen-containing gas is incorporated.

Very good results are obtained by carrying out the step of forming the gaseous dispersion by violently agitating the mixture of gas and slurry in a confined zone substantially filled with said mixture, particularly in a confined zone in which the mixture is urged outwardly by centrifugal force against an uneven solid surface. For example, the mixture may be passed through an agitating and disintegrating device, such as a Rietz disintegrator, a Jackson and Church continuous shredder, a Fitzpatrick comminuting machine, or a Bauer mill, all of which are described more fully below.

The Rietz disintegrator is a hammer mill comprising a vertical shaft on which are fixed wide-faced horizontal blades or hammers. The assembly of shaft and hammers is surrounded by a perforated screen and an outer skirt, the screen being in close proximity to the tips of the hammers. When the apparatus is used in the process of this invention, the gas and slurry enter above the hammers and are thrown by the rotation of said hammers against and through the screen and against the outer skirt. The resulting dispersion is removed from the bottom of the machine.

The Fitzpatrick comminuting machine is similar to the Rietz disintegrator. However, the blades or hammers of the Fitzpatrick machine are mounted on a horizontal shaft instead of a vertical shaft and the perforated screen surrounds only the bottom half of the assembly of shaft and hammers, the screen and said assembly being enclosed within a housing. When this apparatus is used in the practice of the present invention, the gas and slurry are fed into the housing, above the rotating hammers, and are thrown downward through the screen by the action of said hammers.

The Jackson and Church continuous shredder and the Bauer mill are disc refiners, each comprising two spaced plates, one stationary and the other rotatable, supported within a housing. In each machine both plates are equipped with interfitting shredding teeth, but in the Jackson and Church shredder the plates are horizontal, while in the Bauer mill the plates are vertical. When these refiners are used in the process of the present invention, the gas and slurry enter through an opening at the center of the stationary plate and are propelled outward against and between the teeth of the plates due to the centrifugal force caused by the rotation of the movable plate. The dispersion which is formed by the agitating and disintegrating action of the device is then discharged from the housing. If desired, the dispersion may be formed in a disc refiner in which both of the plates rotate in opposite directions, for example, in a double disc Bauer mill.

One highly advantageous method of forming the mixture of gas and slurry is to supply the gas to a stream of the slurry flowing through a pipe leading to the agitating and disintegrating device. The gas may be forced under pressure into the stream of slurry, or it may be aspirated into said stream, the stream being under reduced pressure in said pipe due to the action of the agitating and disintegrating device.

The gas employed in the process of this invention may be substantially pure oxygen, or it may be air or any other suitable mixture of oxygen and another gas. The use of oxygen, as such, effects a more rapid aging of the alkali cellulose than the use of air. The amount of oxygen-containing gas may be varied widely. For example, it has been found that the results are substantially the same when the amount of air introduced is 1/60 cubic foot (at standard condition) per gallon of slurry and when it is 1/5 cubic foot per gallon of slurry.

The time taken to form the dispersion, i. e. the residence time of the mixture of gas and slurry in the confined zone where it is subject to violent agitation, is quite short, e. g. on the order of about one second or less.

With respect to the emulsifying agent, especially desirable results are obtained when this material is a sodium salt of a highly sulfated fatty acid, particularly a sodium salt of a sulfated oleic acid in which substantially all of the oleic acid molecules are bound to sulfate radicals. The sodium salt may be added, as such, to the alkaline medium, e. g. to the slurry or to the aqueous alkali used to form the slurry, or it may be formed in situ by the addition of the sulfated acid to said alkaline medium. One such emulsifying agent which yields optimum results is the purified aqueous solution sold under the name "Prestabit Oil V-New" and having the following characteristics:

| | |
|---|---|
| Specific gravity, 20° C | 1.127 |
| Moisture, percent | 46.7 |
| Refractive index, 27½° C | 1.4118 |
| Ash, percent | 16.52 |
| Iron, percent | 0.015 |
| Acid number, mg. KOH/g | 30.3 |
| Saponification number, mg. KOH/g | 32.6 |
| Unsaponifiable matter, percent | 0.122 |
| Iodine value, mg. iodine absorbed/g | 16.5 |
| Alkalinity, mg. NaOH/g | 27.1 |
| Total SO$_3$, percent | 7.03 |

Although optimum results are obtained when the emulsifying agent is a sodium salt of a highly sulfated fatty acid such a "Prestabit Oil V-New," other emulsifying agents may be employed in the process of this invention. Examples of other emulsifying agents effective in alkaline medium and within the scope of this invention are reaction products of ethylene oxide and amides of coconut oil fatty acids, such as the product sold under the name "Nopco–1179 M," cationic derivatives of higher alkyl amines, such as the product sold under the name "Soromine BSA Paste," polyoxyethylene ethers of higher alcohols, such as the product sold under the name "Brij–30," and alkylated aryl polyether alcohols, such as the product sold under the name "Triton X–100."

The amount of emulsifying agent in the slurry may be varied widely. Generally speaking, an increase in the amount of emulsifying agent usually results in an increase in the rate and extent of aging but also effects an increase in the volume of the gasified slurry and makes it more difficult to remove the dispersed gas therefrom at the end of the aging period. Very good results have been obtained when the amount of sodium salt of sulfated oleic acid is about 1/8% to 2%, preferably about 1/2%, based on the weight of the cellulose in the dispersion.

The uniform dispersion produced according to the present invention contains numerous small bubbles of the oxygen-containing gas and is quite stable. Microscopic examination shows that most of these bubbles are smaller than 120 microns in diameter, the average size of the bubbles being about 30 to 60 microns, and that the fibers of alkali cellulose are well separated from each other. The small bubbles cling to the surfaces of the fibers, almost completely surrounding many of them.

After the dispersion has been formed it is allowed to stand, quiescent or under mild agitation. In the continuous process of this invention this operation of allowing the dispersion to stand is carried out, as previously stated, while the dipersion is in the form of separate small batches moving through an aging zone, said small batches being formed by successively subdividing the continuous stream of slurry emerging from the agitating and disintegrating device. While there is some reduction in the degree of polymerization of the alkali cellulose during the formation of the dispersion, by far the greatest portion of the reduction in degree of polymerization takes place progressively while the dispersion is standing, even though no further gas is incorporated into the dispersion during this period. This progressive aging effect has been observed to continue for a considerable period, e. g. for more than 80 minutes, even when the dispersion is subjected to continuous mild agitation, as by means of baffles moving therethrough or by means of a submerged propeller-type stirrer, throughout the standing period. This contrasts sharply with the results obtained when no emulsifying agent is present. In the latter case no substantial further aging takes place after the dispersion has been standing for about 10 minutes under continuous agitation. In addition, when the emulsifying agent is present the rate of aging is much more rapid, even during the first few minutes of the standing period, than when there is no emulsifying agent in the dispersion, regardless of whether the dispersion is agitated mildly or maintained quiescent.

The temperature of the dispersion, which is preferably about 45° C. to 75° C., has a definite effect on the rate of aging. Although the rate of aging at first increases as the temperature increases, we have found that a further increase in the temperature above about 65° C. has the opposite effect. It is postulated that this is due to the fact that the reactivity of the alkali cellulose with oxygen increases as the temperature increases, while the solubility of oxygen in the dispersing medium, i. e. aqueous caustic, decreases as the temperature increases. Also the rate of diffusion of oxygen through the dispersion medium varies with the temperature. The best balance of these factors occurs in the range of about 60 and 65° C. when the pressure is atmospheric. It is advantageous to heat the aqueous alkali to about 60 and 65° C. before the shredded cellulose is added thereto and to maintain the temperature of the alkali, slurry and gaseous dispersion within this range throughout the aging process. However, if desired, the alkali may be originally at a lower temperature e. g. 35° C., and the slurry formed therefrom may be heated to about 60 and 65° C. just before the gaseous dispersion is formed.

As indicated previously, in the continuous process of this invention by far the greatest portion of the reduction in the degree of polymerization of the dispersion of oxygen-containing gas in the slurry takes place while said dispersion is in the form of separate successive small batches which pass uniformly through an aging zone. These batches are formed by successively subdividing the continuous stream of dispersion flowing from the agitating and disintegrating device. In order to obtain a substantially uniformly aged alkali cellulose, i. e. an alkali cellulose in which there is only a relatively small range of variation in the degree of polymerization, the intervals of time between successive subdivisions of said continuous stream of dispersion should be relatively short. These intervals of time may be expressed in terms of the total time for aging the batches of alkali cellulose. Thus, the continuous stream flowing from the agitating and disintegrating device should be subdivided at intervals of time which are no more than about one tenth the total aging time, advantageously 1/30 to 1/60 or an even smaller proportion of the total aging time. For example, when the total aging time is 30 minutes the continuous stream of dispersion flowing from the agitating and disintegrating device may desirably be subdivided at intervals of about 3/4 minute, which represents only 1/40 of the total aging time, so that each successive batch contains only the dispersion which has flowed in said continuous stream during the aforesaid period of 3/4 minute. The intervals of time between successive subdivisions of said continuous stream may also be expressed in terms of the number of batches, prepared from one continuous stream, passing through the aging zone at any one time. Thus, in the example given above, there are 40 such batches passing through the aging zone, and, generally speaking, there should be at least about 10, preferably 30 to 60 or even more of such batches.

Since, as pointed out above, each of the batches of dispersion passing through the aging zone consists of the amount of dispersion which has been produced in a relatively short period of time, there will be only a relatively small variation, within each batch, in the residence time in said aging zone of the various molecules of alkali cellulose in said batch. Thus, in the example previously given, the variation, within each batch, in the residence time in the aging zone is only about 3/4 minute in a total of 30 minutes. Accordingly all of the molecules of aged alkali cellulose within each batch will have been subjected to the aging conditions for substantially the same period of time and will, therefore, have substantially the same degree of polymerization, providing, of course, that the cellulose used in the process is substantially uniform to start with. Furthermore, in the continuous process of this invention, all of the separate successive batches of slurry remain in the aging zone for identical periods of time, so that the aged alkali cellulose emerging from said zone will be substantially uniform throughout said continuous process.

One convenient apparatus for subdividing the continuous stream of dispersion emerging from the agitating and disintegrating device and for moving the resulting batches of dispersion through the aging zone is the delay unit disclosed in the application of Bradshaw, James and Shaw, Serial No. 403,788, filed on even date herewith. This delay unit includes a rotating aging tank comprising an insulated horizontal cylindrical shell and a central core. The continuous stream of dispersion, or gasified slurry, from the agitating or disintegrating device flows directly to one end of this tank and is moved, from the inlet end of the tank to the outlet end, through the annular space between the core and the shell, by the action of a spiral vane which runs the entire length of the tank and extends between the core and the shell, there being advantageously a relatively large number of convolutions (10 or more, preferably about 40) of the spiral vane within the shell. The vane is fixed to, and rotates with, the other parts of the tank, i. e. the core and shell. Accordingly, the rate of movement of the dispersion through the tank and the level of the dispersion therein can be regulated by varying the rate of rotation of the tank. In operation the tank is rotated at such a rate that the level of the dispersion never rises above the top of the core, so that none of the dispersion can flow over the top of the core. Accordingly, the dispersion moves through the aging tank between the convolutions of the spiral vane in the form of separate successive batches, which cannot blend with each other over the top of the core, and there is substantially no intermingling of said batches in the tank during their progress therethrough. However, the outlet end of the aging tang is so constructed that the aged dispersion is discharged therefrom in the form of a smoothly flowing continuous stream with a minimum of intermingling of successive batches of said dispersion. In this form of the apparatus the interval of time for discharging each batch is about the same as, or slightly greater than, the interval of time for filling each batch, e. g. about 3/4 minute to one minute under the conditions set out above. Thus, that portion of each uniformly mixed batch of slurry which is discharged last will be retained in the tank for a slightly longer period than that portion of the slurry which is discharged first and there will therefore be a slight cyclical variation in the average degree of polymerization of the alkali cellulose in the stream of slurry discharged from the tank. However, this variation is very much less than that obtained in conventional processes for aging alkali cellulose.

There is some tendency for the dispersion, or gasified slurry, to separate on standing, the gasified alkali cellulose fibers tending to rise to the top. To prevent such separation, and to cause those of the small bubbles of gas which have coalesced to larger size to leave the mass of slurry, the aging tank is advantageously provided with means, such as baffles mounted between, and fixed to, adjacent convolutions of the spiral vane, for mildly agitating the dispersion as it passes through the tank.

As stated, the aging process is carried out at a controlled elevated temperature. To this end heat-insulating material is provided around the walls of the aging tank so that the temperature of the stream of aged dispersion leaving said tank is substantially the same as the temperature of the stream of dispersion entering said tank, e. g. a temperature of about 65° C.

After the dispersion, or gasified slurry of alkali cellulose, has been aged to the desired extent, the aged gasified slurry is prepared for further treatment, and the aging process is halted, by subjecting said slurry to a degassing operation and, advantageously, cooling the slurry at the same time. One convenient method of degassing and cooling the slurry involves placing it under subatmospheric pressure, which aids in the removal of the gas from the slurry and also effects a cooling of the slurry due to the evaporation of water therefrom. Desirably, the slurry while under subatmospheric pressure is subjected to centrifugal force which causes the bubbles of gas to separate rapidly from the slurry.

As stated, the aged gasified slurry leaving the previously described aging zone is at an elevated temperature, e. g. 65° C. Advantageously, the subatmospheric pressure to which this heated slurry is subjected should be sufficiently low to cause this heated slurry to boil at this elevated temperature, and this pressure should be maintained at a value at least as low as the equilibrium vapor pressure of water from the cooled slurry at the desired final slurry temperature, which is, for example, about 45° C.

One convenient method and apparatus for degassing and cooling the aged gasified slurry is disclosed in the copending application of Bradshaw and Shaw, Serial No. 403,750, filed on even date herewith, wherein the stream of the aged gasified slurry is injected into a tank maintained at a reduced pressure and the injected stream is directed in a curved path whereby there is developed in said stream a centrifugal force. More particularly, the aforesaid copending application describes a degasser which comprises a degassing tank within which there is an open cylindrical vertical flash tube, spaced from the walls of said tank. The stream of aged heated gasified slurry emerging from the previously described aging tank is pumped directly at a constant rate into the interior of the flash tube through a nozzle, the tip of said nozzle being arranged to discharge the gasified slurry tangentially along the inner surface of the flash tube. The gasified slurry leaves the nozzle horizontally at a high velocity, desirably a velocity greater than the speed of sound in said slurry, and travels downwardly, due to the effect of gravity, in a thin layer in a spiral or helical path around the inner surface of the flash tube. During this movement of the slurry the dispersed gas and a portion of the water leave the slurry and are removed from the tank by means of an evacuator connected to the top of the tank. The resulting degassed and cooled slurry accumulates in the bottom of the tank, from which it is withdrawn continuously.

The cooled degassed slurry emerging from the degassing tank is then treated continuously in a dewatering press, of conventional construction, to separate the aqueous alkali from the aged alkali cellulose which is obtained in sheet or crumb form. As previously stated, the separated aqueous alkali is recycled to the beginning of the process while the crumbs of aged alkali cellulose are xanthated and dissolved in aqueous caustic soda to produce viscose.

The following examples are given to illustrate the invention further.

*Example I*

Steep soda, comprising an 18½% aqueous solution of sodium hydroxide, and containing 0.04% of "Prestabit Oil V-New" is heated to a temperature of about 65° C. Dry shredded wood pulp cellulose is continuously added to said steep soda in an amount sufficient to produce a mixture containing 4% of cellulose, and the resulting mixture is agitated, by means of a submerged stirrer, for 10 to 15 minutes to produce a slurry of alkali cellulose in steep soda, the concentration of sodium hydroxide in the latter being now about 18%. This slurry is passed continuously through a pipe, leading to a Bauer mill, at the rate of 60 gallons per minute and air is metered into said pipe at the rate of 10.3 cubic feet per minute (measured at standard conditions, i. e. a temperature of 70° F. and atmospheric pressure). The mixture of slurry and air passes through said Bauer mill which is provided with a stationary plate and with a moving plate rotating at 1800 revolutions per minute, each plate being 18 inches in diameter and having relatively large coarse teeth. The residence time of the mixture in the mill is about one second or less, during which time the mixture is subjected to violent impact and shear and a uniform dispersion of bubbles of air in said slurry is formed. The aeration causes a 42% increase in the volume of the slurry. The dispersion is passed directly to a rotating aging tank of the type described in the copending application of Bradshaw, James and Shaw, discussed above. The tank, which includes a spiral vane having 40 convolutions, is rotated at such a rate that the dispersion remains therein for 30 minutes. The stream of aged dispersion discharged from the aging tank is then pumped directly to a degassing tank of the type described in the copending application of Bradshaw and Shaw, discussed previously, and then dewatered in a press. The degree of polymerization of the resulting alkali cellulose, originally 880, is 464. For comparison, samples are taken at various points as the dispersion passes through the aging tank. These samples show that after 5 minutes of aging the degree of polymerization has been reduced to 615; after 10 minutes to 541; after 15 minutes to 500; after 20 minutes to 476; and after 25 minutes to 468.

*Example II*

Example I is repeated except that the Prestabit Oil V-New is replaced by another emulsifying agent, "Nopco-1179 M," the reaction product of about three moles of ethylene oxide with one mole of the amides of coconut oil fatty acids, in one instance, and "Soromine BSA Paste," a cationic derivative of a higher amine, in another instance. After 25 minutes of aging the degree of polymerization in each case is about 570, while after 30 minutes it is about 545, showing that the depolymerization process is still continuing at an appreciable rate.

*Example III*

Example I is repeated except that the rotary plate is run at about 1160 revolutions per minute and a series of experiments are carried out at various slurry temperatures ranging from 45 to 75° C. The variations in temperature have little effect on the increase in the volume of the slurry, this increase ranging from 26 to 32%, but do have an appreciable effect on the degree of polymerization of the alkali cellulose, as shown by the following table.

| Temperature | 45 | 50 | 55 | 60 | 65 | 70 | 75 |
| --- | --- | --- | --- | --- | --- | --- | --- |
| Degree of Polymerization after 30 minutes | 669 | 597 | 539 | 469 | 476 | 492 | 539 |

It is also observed that at the higher temperatures, e. g. 75° C., the initial rate of aging is highest but the rate of aging decreases relatively rapidly on standing.

*Example IV*

Example I is repeated except that the amount of pulp added is sufficient to yield a 3 percent, rather than a 4%, concentration of cellulose. After 5 minutes of aging the degree of polymerization of the alkali cellulose is 611; after 10 minutes 542; after 15 minutes 495; after 20 minutes 473; after 25 minutes 448; and after 30 minutes 431.

In each of the above examples the degree of polymerization of the alkali cellulose is determined by a "viscose dispersion" method.

It is to be understood that the foregoing detailed description is given merely by way of illustration and that many variations may be made therein without departing from the spirit of our invention.

Having described our invention, what we desire to secure by Letters Patent is:

1. Process for the production of aged alkali cellulose, which comprises mixing cellulose, aqueous alkali and an emulsifying agent to form a slurry and subjecting a mixture of said slurry and an oxygen-containing gas to agitation to form a uniform dispersion of bubbles of said gas in said slurry.

2. Process for the production of aged alkali cellulose, which comprises mixing cellulose, aqueous alkali and an emulsifying agent to form a slurry and subjecting a mixture of said slurry and an oxygen-containing gas to violent agitation in a confined zone in which the mixture is urged outwardly by centrifugal force against an uneven solid surface to form a uniform dispersion of bubbles of said gas in said slurry.

3. Process for the production of alkali cellulose, which comprises subjecting a mixture of an oxygen-containing gas and a slurry of alkali cellulose in steep soda containing an emulsifying agent to violent agitation to form a uniform dispersion of bubbles of gas in said slurry and allowing said dispersion to stand to effect aging of said alkali cellulose.

4. Process of claim 3 in which the temperature is 45 to 75° C. and the concentration of cellulose in the slurry is about 2 to 6% by weight.

5. Process of claim 3 in which the temperature of said dispersion is about 60 to 65° C.

6. Process as set forth in claim 1 in which the emulsifier is a sodium salt of a sulfated fatty acid.

7. Process as set forth in claim 1 in which the emulsifier is a sodium salt of sulfated oleic acid in which substantially all of the oleic acid molecules are bound to sulfate radicals.

8. Process as set forth in claim 3 in which the majority of the bubbles have a diameter of less than 120 microns, the emulsifier is a sodium salt of sulfated oleic acid, the amount of said salt is about 0.1 to 2% based on the weight of the cellulose in said slurry, and the temperature is about 60° C. to 65° C.

9. Process for the production of aged alkali cellulose, which comprises mixing an oxyen-containing gas into a stream of slurry of alkali cellulose in steep soda, containing sodium salt of sulfated oleic acid as an emulsifier, said soda having a concentration of about 18% of sodium hydroxide and the concentration of cellulose in said slurry being about 3 to 4%, subjecting the resulting mixture to violent agitation in a confined zone in which the mixture is urged outwardly by centrifugal force against an uneven solid surface, to form a uniform dispersion of bubbles of gas in said slurry, the majority of bubbles in said dispersion having a diameter of less than 120 microns, and allowing said dispersion to stand at a temperature of about 60° C. to 65° C. for a period of time such that the reduction in the degree of polymerization of the alkali cellulose during said standing period is greater than the reduction during said violent agitation.

10. Process for the production of alkali cellulose, which comprises subjecting a mixture of an oxygen-containing gas and a slurry of alkali cellulose in steep soda containing an emulsifying agent to violent agitation to form a uniform dispersion of bubbles of gas in said slurry and allowing said dispersion to stand to effect aging of said alkali cellulose and then removing the bubbles of gas from the resulting aged slurry.

11. Process of claim 10 in which said dispersion contains a sodium salt of sulfated oleic acid.

References Cited in the file of this patent

UNITED STATES PATENTS

| | | |
|---|---|---|
| 1,733,393 | Bassett | Oct. 29, 1929 |
| 2,542,492 | Entwistle et al. | Feb. 20, 1951 |
| 2,592,355 | Tachikawa | Apr. 8, 1952 |
| 2,647,114 | Torke et al. | July 28, 1953 |
| 2,680,738 | Laughlin | June 8, 1954 |
| 2,739,879 | Bates | Mar. 27, 1956 |

FOREIGN PATENTS

| | | |
|---|---|---|
| 653,695 | Great Britain | May 23, 1951 |